July 23, 1957  E. TOROSIAN  2,799,871
STUD DRIVING AND HOLE TAPPING MACHINE
Filed Feb. 7, 1955  4 Sheets-Sheet 1
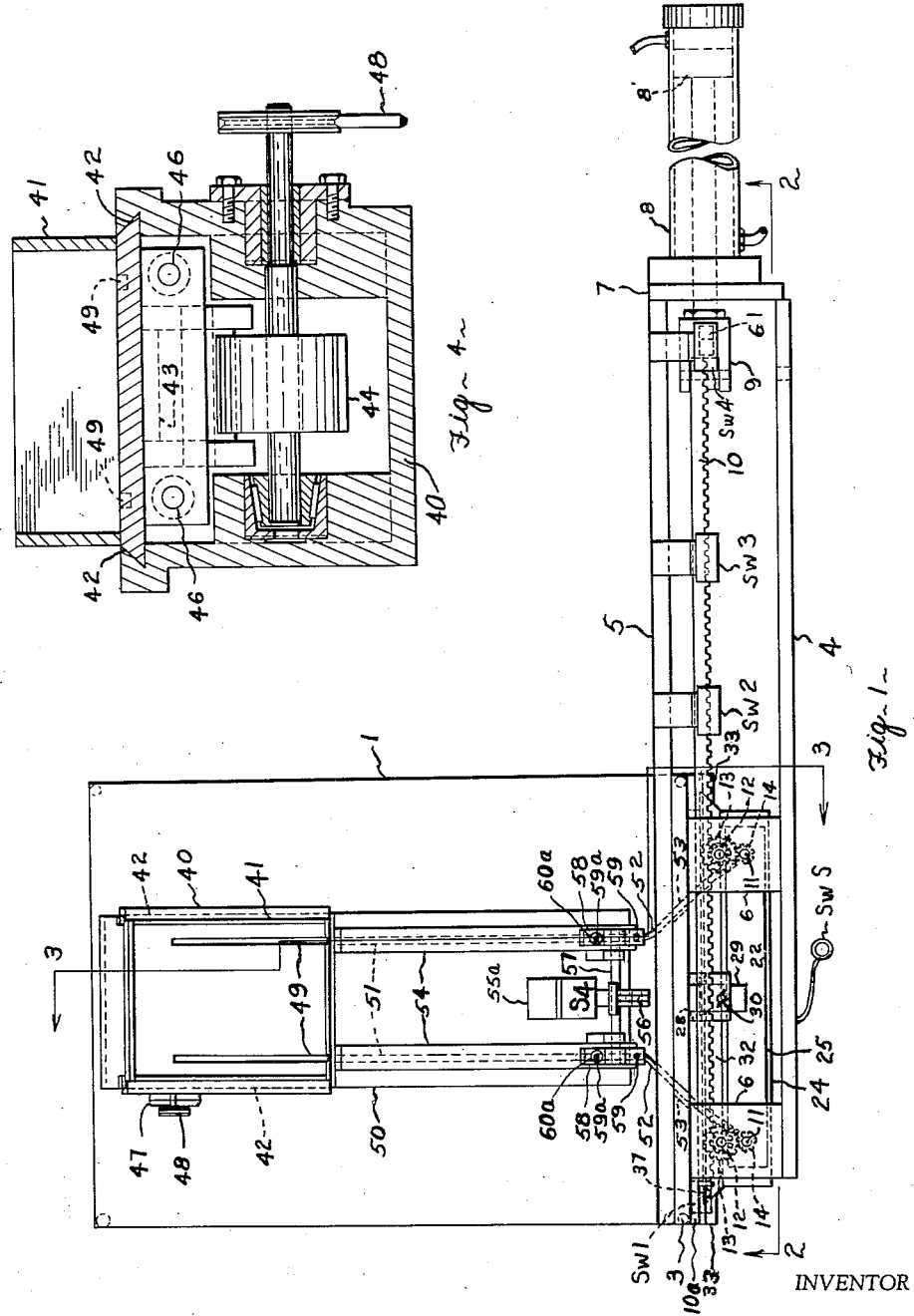
INVENTOR
EDWARD TOROSIAN
BY
ATTORNEY

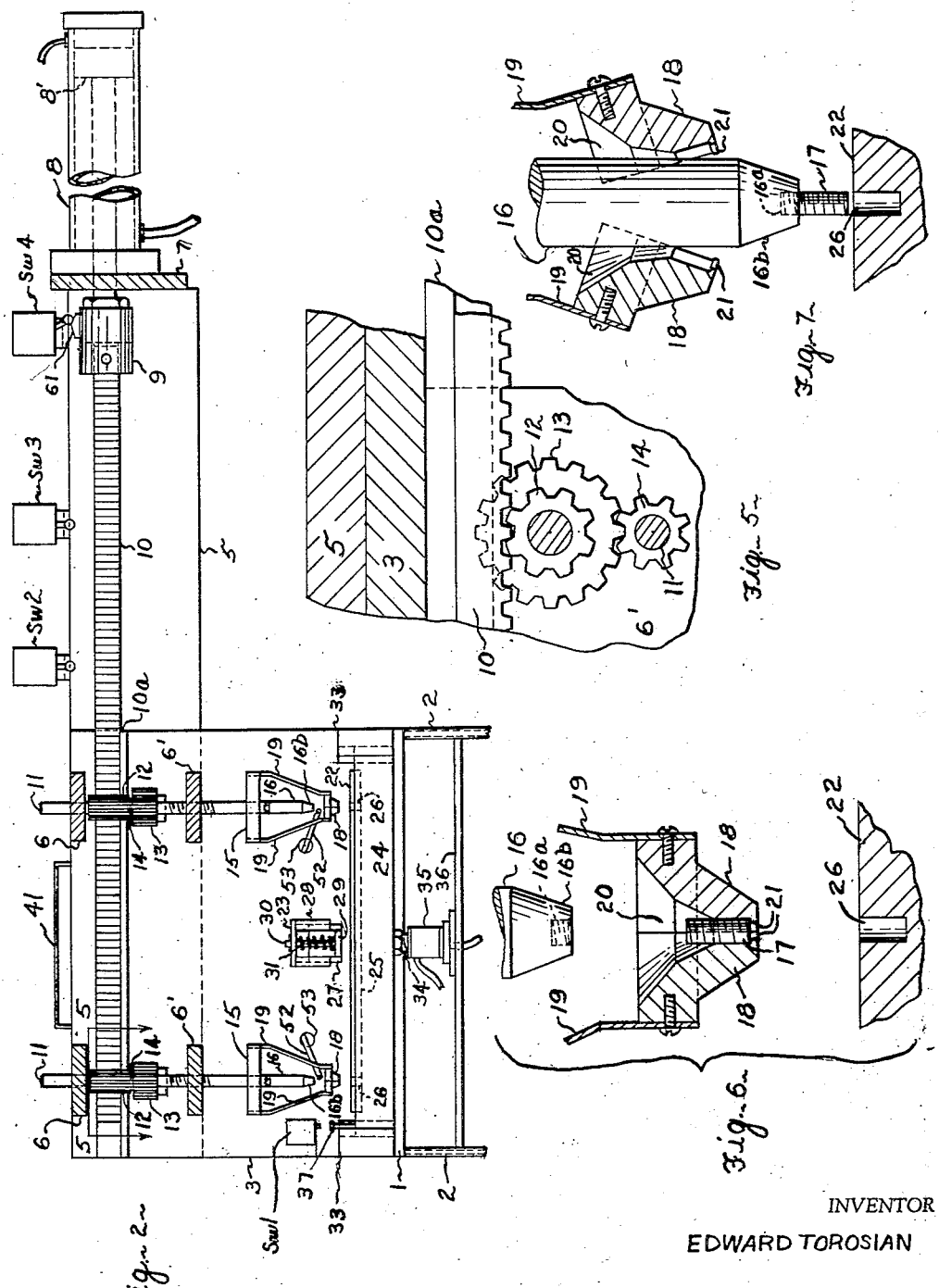

July 23, 1957 E. TOROSIAN 2,799,871
STUD DRIVING AND HOLE TAPPING MACHINE
Filed Feb. 7, 1955 4 Sheets-Sheet 3
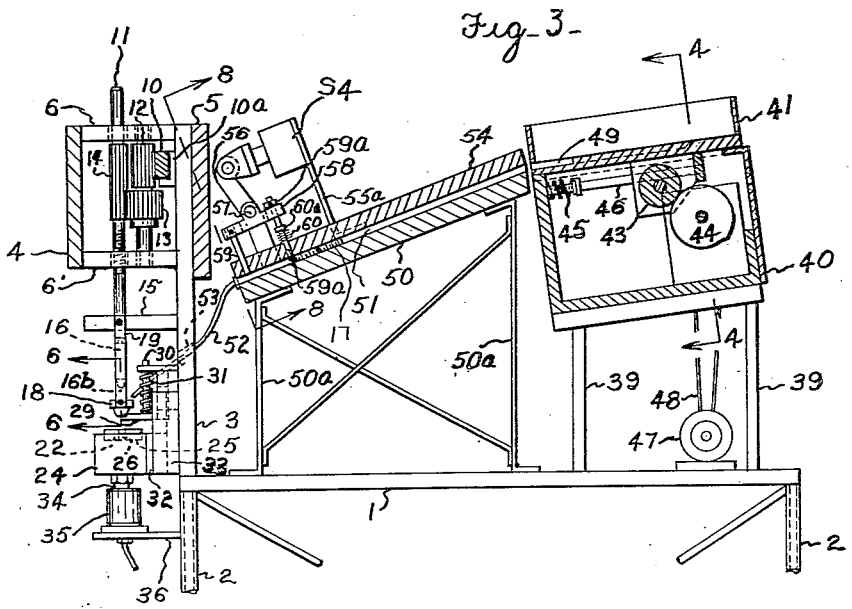
Fig-3-
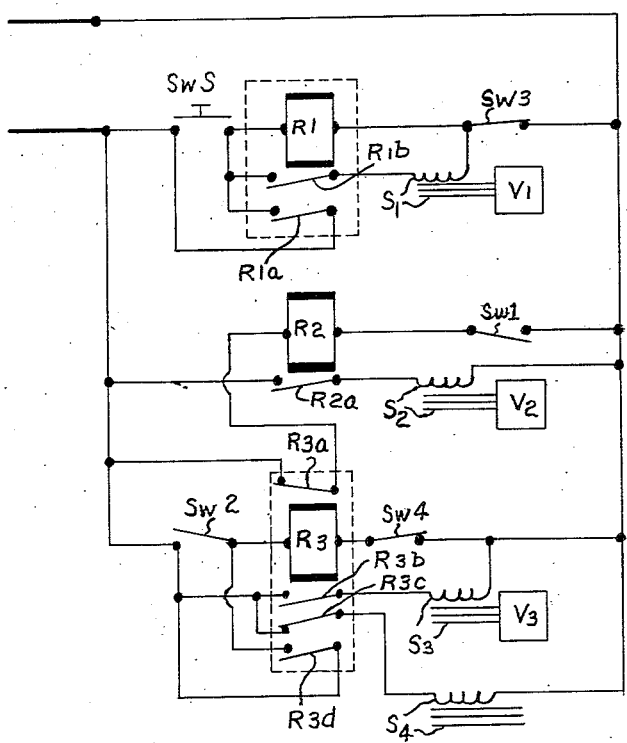
Fig-12-
INVENTOR
EDWARD TOROSIAN
BY
J.S. Murray
ATTORNEY July 23, 1957　　　　E. TOROSIAN　　　　2,799,871
STUD DRIVING AND HOLE TAPPING MACHINE
Filed Feb. 7, 1955　　　　　　　　　　　4 Sheets—Sheet 4
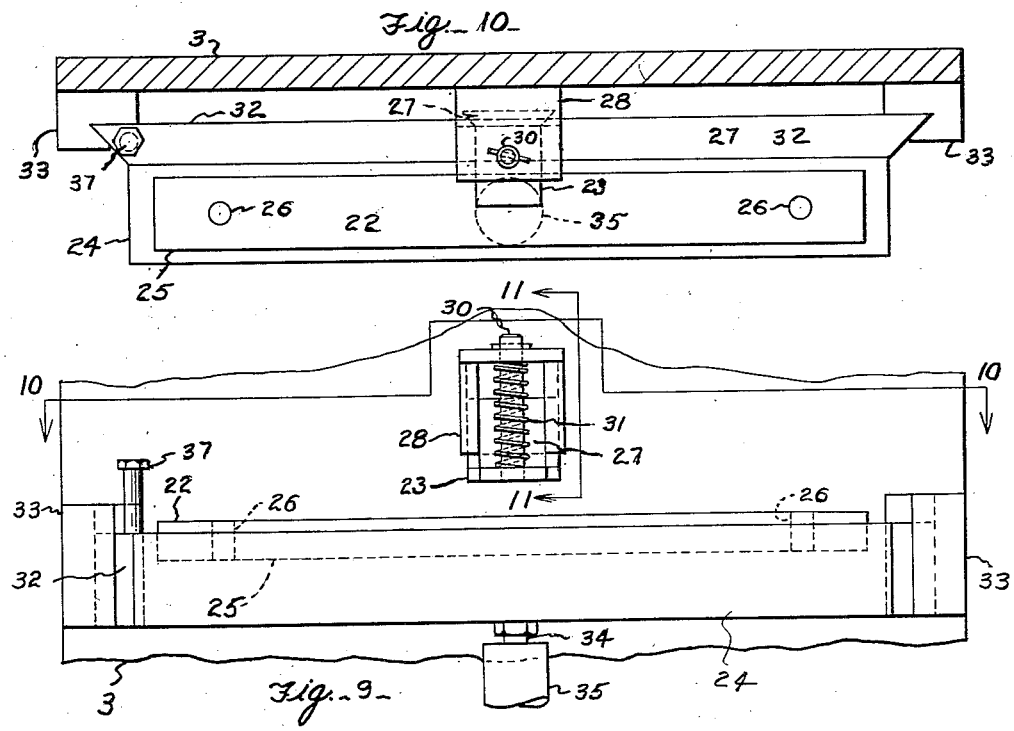
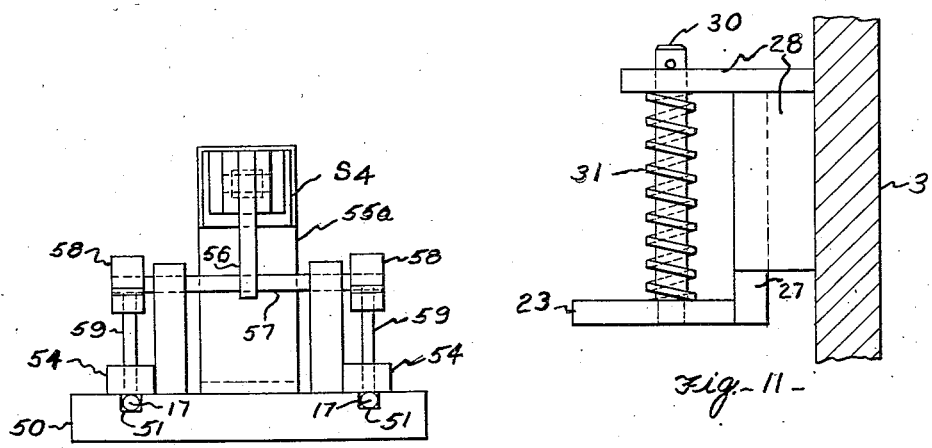
INVENTOR
EDWARD TOROSIAN
BY
*J. S. Murray*
ATTORNEY United States Patent Office 2,799,871
Patented July 23, 1957

2,799,871

STUD DRIVING AND HOLE TAPPING MACHINE

Edward Torosian, Grosse Pointe, Mich., assignor to Stud Drive, Inc., Detroit, Mich., a corporation of Michigan Application February 7, 1955, Serial No. 486,590

5 Claims. (Cl. 10—129)

This invention relates to stud driving machines and particularly machines suited for either driving studs or tapping holes.

An object of the invention is to provide a machine including a work holding clamp, which machine after receiving a work-piece, will respond to a single exercise of control by performing in proper sequence the operations of clamping the work, locating a stud for engagement by a driven chuck, advancing the chuck to such stud and establishing its driving engagement with the stud, advancing the stud into proper engagement with the work piece, retracting the chuck, and unclamping such piece.

Another object is to adapt such a machine to be readily modified for use in tapping holes.

Another object is to provide a machine of the decribed character, well suited to effect the simultaneous driving of several studs or tapping of several holes.

Another object is to electrically correlate the various operations performed by the described machine.

Another object is to provide an improved mechanism for delivering a single stud from a hopper or the like to a positioning device, and for properly timing such delivery with reference to the operating cycle of the described machine.

These and various other objects are attained by the construction hereinafter described and illustrated in the accompanying drawings, wherein:

Fig. 1 is a top plan view of a machine illustrating one embodiment of the invention.

Fig. 2 is a front view of the machine in partial section taken on the line 2—2 of Fig. 1.

Fig. 3 is a vertical sectional view taken on the line 3—3 of Fig. 1.

Fig. 4 is a sectional elevation, enlarged in scale and taken on the line 4—4 of Fig. 3, and showing an agitating mechanism for the stud hopper.

Fig. 5 is a fragmentary horizontal sectional view taken on the line 5—5 of Fig. 2, and showing one of the rack-actuated gear trains through which a drive is transmitted.

Fig. 6 is a fragmentary axial vertical section of one of the stud positioning devices, showing its relation to the corresponding chuck at commencement of a cycle.

Fig. 7 is a similar view showing the chuck advanced to effect initial engagement of a stud with a work piece.

Fig. 8 is a front view as indicated by the line 8—8 on Fig. 3 of a mechanism controlling the release, one by one, of studs to be driven.

Fig. 9 is an enlargement of that portion of Fig. 2, showing a work piece clamp.

Fig. 10 is a top plan view of the same, partially in section on the line 10—10 of Fig. 9.

Fig. 11 is a vertical sectional detail of the upper jaw of said clamp, taken on the line 11—11 of Fig. 9.

Fig. 12 is a diagram of electrical apparatus and circuits controlling operation of the machine.

Drive to stud setting spindles

In the described views, the reference character 1 designates the rectangular base of the machine, such base being preferably elevated on legs 2. Rigidly upstanding from the base, at its front margin is a plate 3, having rigidly secured to its upper portion a forwardly projecting and laterally elongated gear housing comprising front and rear vertical plates 4 and 5 interconnected by a horizontally spaced pair of upper bars 6 and a similar pair of lower bars 6'. Said housing has an end portion projecting laterally considerably beyond the plate 3 (see Fig. 1), and mounting an end plate 7. Fixed upon the plate 7 as a further extension therefrom is a fluid motor comprising a cylinder 8 and a piston 8' reciprocatory in such cylinder. A rod driven by the piston is coupled at 9 to an elongated rack 10 reciprocatory in and lengthwise of the elongated housing and slidably mounted on an angle bar 10a fixed on the plate 3. Extending vertically through said housing and spaced transversely of the machine are two vertical spindles 11, driven from the rack through duplicate gear trains 12, 13 and 14. The spindles have their upper portions journaled in the bars 6 and are further journaled in bearings 15 fixed on the plate 3 below the gear housing. Said spindles are threaded in the bars 6' and hence undergo a predetermined up or down travel when rotatively driven. The pitch of the threads interconnecting the spindles and bars 6' equals that of the studs to be driven assuring a correct rate of up or down travel of the spindles. The spindle-carried gears 14 are adequately long to remain meshed with the gears 13 in all positions of such travel. Rigidly and removably mounted on the lower portion of each spindle is an elongated chuck 16 formed in its lower portion with a socket 16a threaded to engage a stud 17. With each chuck 16 is associated a stud positioning device comprising a cup-shaped receiver 18 formed in axially abutting halves, fixed on the lower ends of a pair of spring arms 19 secured at their upper ends to opposite edges of the overlying mounting plate 15. Said arms yieldably urge the receiver halves toward and against each other, adapting them to retain a stud. As best appears in Fig. 6, the upwardly open pocket 20 of said receiver has a primarily funnel shape but has a reduced, substantially cylindrical downward extension and an annular lip 21 at the lower end of such extension, such lip affording support to a stud guided into said extension by the described pocket (Fig. 6). Thus the receiver assures an upright position of any stud therein, so that such stud registers with the socket 16a of the chuck and will screw into such socket as the chuck is subjected to concurrent rotation and downward travel. When the stud encounters the closed upper end of the socket 16a, it will be advanced and rotated in unison with the chuck, and the beveled lower end 16b of the descending chuck will spread apart the receiver halves, permitting delivery of the stud to an underlying work piece 22, as in Fig. 7.

Clamping mechanism for work

Spaced downwardly from the receiver 18 is a clamp formed by upper and lower jaws 23 and 24, the lower jaw having a recess 25 proportioned to receive and accurately position the piece 22 so that openings 26 drilled in the work may be accurately aligned with studs held by the chucks 16. The upper jaw comprises a plate 27 vertically slidable in a bracket 28 fixed on the plate 3, said sliding plate having a forwardly projecting clamping foot. A pin 30 upstanding from said foot mounts a coiled spring 31, urging said jaw downwardly. The lower jaw is rigidly mounted on a plate 32 vertically slidable in a pair of guides 33 fixed on the plate 3. A piston rod 34 rigidly downwardly extending from the lower jaw is actuable up or down by an air or other fluid motor 35 fixed on a bracket 36. The control for such motor is hereinafter explained. As the jaw 24 reaches its raised position, a peg 37 upstanding on such jaw closes a normally open switch Sw1 (Fig. 2) suitably located on the machine.

Hopper agitating and stud feed mechanism

Elevated above the rear portion of the base 1 by legs 39 is a housing 40 surmounted by an open-topped stud hopper 41. As best appears in Fig. 4, such hopper has slide guides 42 affording it a forward and back travel, and it is preferred to mount the hopper at a slight downward inclination from back to front, as appears in Fig. 3. A roller 43, journaled upon and beneath the hopper, is operatively engaged by a rotary cam 44 of varying radius, such roller and cam occupying the housing 40 with their axes transverse to the machine. Coiled springs 45 acting through rods 46 exert a rearward thrust on the hopper, and a rotary motor 47, acting through a belt 48 transmits a continuous rotation to the cam 44. The arrangement is such that each revolution of the cam imparts a small amplitude forward thrust to the hopper, while permitting the springs 45 to promptly return the hopper to its rear limit of travel. Thus the hopper is subjected in use to a quite rapid vibration. The hopper bottom is formed with a pair of spaced upwardly opening grooves 49 extending to the front edge of said bottom and conforming to the hopper inclination. These are each proportioned to receive a single row of studs, responsive to the aforementioned rapid vibration, and such vibration in conjunction with the inclination of said rows, tends to deliver the studs forwardly in the described grooves.

Between the hopper and plate 3 is installed a plate 50 mounted on legs 50a and downwardly inclined from back to front. A pair of grooves 51 upwardly opening in the plate 50 conform to its inclination and have their rear ends communicating with the grooves 49 of the hopper, whereby studs may feed from the last-mentioned grooves into the grooves 51, gravitationally advancing in the latter. From the front end of the grooves 51, a pair of tubes 52 extend downward and forwardly, passing through apertures 53 in the plate 3 and having outlets discharging respectively into the respective receivers 18. Preferably strips 54 are secured to the plate 50 in a covering relation to the grooves thereof, overcoming any tendency of the studs to escape upwardly. The grooved plate forms in effect two chutes through which the studs are gravitationally delivered.

Upstanding from the front portion of the plate 50 is a stud feed control mechanism comprising a solenoid S4 elevated above said plate by an arm 55a and having its plunger type core pivoted to an arm 56 rigidly and centrally upstanding from a shaft 57. Fixed on the shaft ends and disposed above the grooves 51 is a pair of levers 58, each terminally mounting front and rear downwardly extending pins 59 and 59a. These pins extend slidably through the underlying strip 54 to alternatively enter the corresponding groove, according as the shaft 57 is rocked in one direction or the other. Each front pin is pivotal on the corresponding lever and each rear pin is slidable in such lever and upwardly urged by a coiled spring 60 compressed between said strip and a collar 60a fixed on such pin. When the solenoid is deenergized, the springs 60 act through the collars 60a to slightly raise the two rear pins and thereby lower the front pins. This allows the foremost studs in the grooves 51 to abut the pins 59, while the next following studs assume positions beneath the pins 59a. Upon energization of the solenoid, the front pins are raised allowing escape of the foremost studs while the next following studs are engaged and held in place by the rear pins. Thus the studs are delivered one by one to each receiver 18 at a definite period in the cycle determined by energization of the solenoid.

Electrical controls and diagram (Fig. 12)

SwS is a normally open, foot controlled starting switch, disposed preferably on the floor near the front of the machine and thus readily accessible to the machine attendant. Preliminary to depressing said switch, the attendant places a workpiece in the recess 25 of the lower jaw 24. Switches Sw2, Sw3, and Sw4 are carried by the housing plate 5 at its upper margin and in such relation to the travel path of the rack 10 as to be successively operable by a cam element 61 fixed on and upstanding from the coupling 9. Switch Sw2 is normally open, and such switch establishes the forward limit of rack travel, and switch Sw4, which is normally closed, establishes the rear limit of such travel. Switch Sw3 is normally closed and is located approximately midway between the switches Sw2 and Sw4. A relay R1 has its coil in series with the switches SwS and Sw3, such relay being thus energized when a cycle is started by closing SwS. The relay has normally open contacts R1a and R1b, the former affording a shunt around SwS so that the attendant need close the latter only momentarily. R1b energizes a solenoid S1 operating a valve V1 to admit a pressure fluid to the motor 35 for raising the jaw 24.

As hereinbefore stated, the jaw 24, in its raised position, closes a normally open switch Sw1 fixed at the front of the machine, this energizing a relay R2 series-connected to said switch and also to a normally closed contact R3a of a relay R3. The relay R2, through its single contact R2a now energizes a solenoid S2 which opens a valve V2 to forwardly drive the piston 8' together with the rack. The cam element 61, in its forward travel, does not disturb the closed position of the switch Sw3. As said element encounters and closes the switch Sw2, there is closed a circuit including relay R3 and the normally closed switch Sw4. The contact R3a of such relay now breaks the circuit of relay R2 which in turn breaks the circuit of solenoid S2 which acts on the valve V2 to exhaust fluid at rear of the piston 8'. The contact R3b of relay R3 is now closed, energizing the solenoid S3 which operates the valve V3 to admit fluid ahead of the piston 8' initiating a rearward stroke. The contact R3c is opened by its relay, deenergizing the solenoid S4 to allow a spring-induced projection of its plunger core and thus admit another stud between the pins 59 and 59a. The contact R3d is closed by its relay to maintain energization of the relay R3 throughout the retraction of the element 61, since Sw2 must open at commencement of such retraction. The switch Sw3 is momentarily opened by the actuator 61 during retraction of the latter, thus deenergizing the solenoid S1 and allowing the clamp jaw 24 to resume its lower position and thus release the work. Retraction of the element 61 ceases upon such element encountering and opening the switch Sw4, since this breaks the coil circuit of relay R3. Deenergization of relay R3 also allows contact R3c to regain its normal closed position, whereby the core of S4 is retracted, allowing a stud to enter the receiver 18 preliminary to the next cycle of operation. It will, of course, be understood that forward actuation of the rack 10 effects lowering of the chucks and driving of the chucked studs, while retraction of the rack releases the chucks from the driven studs and returns the chucks to their raised positions. Such solenoid-operated valves as appear at V1, V2, and V3 are well known and require no detail illustration.

While the machine is illustrated as adapted to concurrently drive two studs, it is evident that the number of studs driven in each cycle may be increased to meet the needs of any particular work-piece by simply increasing the number of chucks and mechanisms for driving them from the rack, and similarly increasing the stud positioning devices and feed provisions.

In use of the machine for setting steel studs in aluminum or other relatively soft metals, the workpiece sockets need not be pretapped, since the stud threads will progressively extrude mating threads in the work.

The described machine can be converted to the purpose of tapping one or more holes in work by merely replacing the chucks 16 by ordinary chucks suited to hold taps, and disconnecting the mechanisms for delivering studs to the receivers, the cycle of operations being unchanged except for omission of stud feeding. Said machine is capable of quite rapid operation, its speed being limited only by an attendant's ability to supply workpieces to the machine and remove them at close of each cycle. Since the machine idles at completion of each cycle, the intervals between cycles may be suited to the attendant's ability to handle the workpieces.

What I claim is:

1. In a machine of the character described and of the type comprising a spindle, a chuck carried and driven by the spindle, a mounting in which the spindle is rotatable and reciprocable, a reciprocatory rack bar, gearing for rotatively driving the spindle from such bar, a pair of intermeshed screw threads for feeding the spindle along its axis responsive to and in a predetermined ratio to its rotation, the combination with such machine of a fluid motor for advancing and retracting the rack bar, a switch actuator mounted on and reciprocatory with the rack bar, a normally closed switch engaged and opened by said actuator in the limiting retracted position of the rack bar, mechanism for deenergizing said motor responsive to opening said switch, a second electric switch, normally open and closed by said actuator in the limiting advanced position of the rack bar, mechanism for reversing said motor responsive to closing of the second switch, a clamp for receiving a workpiece and aligning an opening of such piece with the spindle, a motor for closing said clamp on a workpiece, a third switch, normally closed, and opened by said actuator in the course of retraction of the rack bar, and mechanism for deenergizing the clamp-actuating motor responsive to opening of the third switch.

2. In a machine of the character described as set forth in claim 1, said spindle being disposed substantially vertically and said clamp comprising an upper and a lower jaw, the lower jaw having a recess proportioned to receive a workpiece and accurately position such piece with reference to said chuck.

3. In a machine of the character described as set forth in claim 1, said spindle being disposed substantially vertically and said clamp comprising an upper and a lower jaw, the lower jaw having a recess proportioned to receive a workpiece and accurately position such piece with reference to said spindle, means yieldably urging the upper jaw downwardly to establish its initial position of work engagement.

4. In a machine for driving studs of the type comprising a spindle, a chuck carried and driven by the spindle and adapted to receive a stud, a mounting in which the spindle is rotatable and reciprocable, a reciprocatory rack bar, gearing for rotatively driving the spindle from such bar, a pair of intermeshed screw threads for feeding the spindle along its axis responsive to and in a predetermined ratio to its rotation, the combination with such machine of a fluid motor for advancing and retracting the rack bar, a switch actuator mounted on and reciprocatory with the rack bar, a normally closed switch engaged and opened by said actuator in the limiting retracted position of the rack bar, mechanism for deenergizing said motor responsive to opening said switch, a second electric switch, normally open and closed by said actuator in the limiting advanced position of the rack bar, mechanism for reversing said motor responsive to closing of the second switch, a clamp for receiving a workpiece and aligning an opening of such piece with the spindle, a motor for closing said clamp on a workpiece, a third switch, normally closed, and opened by said actuator in the course of retraction of the rack bar, mechanism for deenergizing the clamp-actuating motor responsive to opening of the third switch, a stud receiver in the path of reciprocation of the spindle and between the spindle and said clamp, means for conducting studs successively to the receiver, and means for controlling such conduction including a solenoid, having its circuit normally open, and means for closing such circuit responsive to opening of the first mentioned switch.

5. In a machine of the character described and of a type comprising a spindle, a chuck carried and driven by the spindle, a mounting in which the spindle is rotatable and reciprocable, a reciprocatory rack bar, gearing rotatively driving the spindle from such bar, a pair of intermeshed screw threads for feeding the spindle along its axis responsive to and in predetermined ratio to its rotation, the combination with such a machine of a fluid motor for reciprocating said bar, two electrical switches spaced along the path of said bar, an actuator for the switches mounted on and reciprocatory with the bar, mechanism electrically controlled by the switches for energizing the fluid motor oppositely according as the actuator takes effect on one or the other switch, a clamp for receiving a workpiece and aligning an opening of such piece with the spindle, said clamp including a movable jaw, a fluid motor for actuating such jaw, an electrical device controlling the last mentioned motor, a switch operable by the machine attendant for energizing the electrical device, a switch actuatable by said movable jaw in its work-clamping position, and means responsive to the last mentioned switch for energizing the first mentioned fluid motor to initiate a cycle of the machine operation.

References Cited in the file of this patent

UNITED STATES PATENTS

| | | |
|---|---|---|
| 534,015 | Sleffel | Feb. 12, 1895 |
| 828,466 | Doran | Aug. 14, 1906 |
| 1,319,740 | Wickstrom | Oct. 28, 1919 |
| 1,656,758 | Saylor | Jan. 17, 1928 |
| 1,967,507 | Hubbard | July 24, 1934 |
| 2,068,084 | Stahlhammer | Jan. 19, 1937 |
| 2,245,165 | Spry | June 10, 1941 |
| 2,271,844 | Olson | Feb. 3, 1942 |
| 2,318,335 | Schauer et al. | May 4, 1943 |
| 2,501,738 | Prutton | Mar. 28, 1950 |
| 2,584,456 | Humphreys | Feb. 5, 1952 |
| 2,644,964 | Mackintosh | July 14, 1953 |
| 2,690,856 | Trondle | Oct. 5, 1954 |
| 2,759,202 | Marsden | Aug. 21, 1956 |